US011308832B2

(12) United States Patent
Valente et al.

(10) Patent No.: US 11,308,832 B2
(45) Date of Patent: Apr. 19, 2022

(54) HEAD MOUNTED DISPLAY WITH MECHANICAL SCANNING

(71) Applicant: Google LLC, Mountain View, CA (US)

(72) Inventors: Matthew Valente, Mountain View, CA (US); Konstantin Gromov, Mountain View, CA (US); Kyle Skelton, Mountain View, CA (US); John Fitch, Los Altos, CA (US); Clayton Kimber, Mountain View, CA (US); Ozan Cakmakci, Sunnyvale, CA (US); Adrian Wong, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/767,339

(22) PCT Filed: Oct. 2, 2019

(86) PCT No.: PCT/US2019/054250
§ 371 (c)(1),
(2) Date: May 27, 2020

(87) PCT Pub. No.: WO2020/072612
PCT Pub. Date: Apr. 9, 2020

(65) Prior Publication Data
US 2021/0005123 A1 Jan. 7, 2021

Related U.S. Application Data

(60) Provisional application No. 62/741,809, filed on Oct. 5, 2018.

(51) Int. Cl.
*G09G 5/10* (2006.01)
*G09G 3/02* (2006.01)
*G02B 27/01* (2006.01)

(52) U.S. Cl.
CPC ........... *G09G 3/02* (2013.01); *G02B 27/0176* (2013.01); *G02B 2027/0154* (2013.01); *G09G 2320/064* (2013.01); *G09G 2320/0646* (2013.01)

(58) Field of Classification Search
CPC .................. G09G 3/02; G02B 27/0176; G02B 2027/0154; G09B 2320/064
(Continued)

(56) References Cited

U.S. PATENT DOCUMENTS 5,859,624 A    1/1999   Matsumoto et al.
6,037,876 A *  3/2000   Crouch ..................... G09F 9/33
                                           340/815.53
(Continued)

FOREIGN PATENT DOCUMENTS

EP    1113506 A2    7/2001
EP    1146572 A2    10/2001
(Continued)

OTHER PUBLICATIONS

International Search Report and Written Opinion dated Jan. 7, 2020 for corresponding International Application No. PCT/US2019/054250, 14 pages.
(Continued)

*Primary Examiner* — Jonathan M Blancha

(57) ABSTRACT

A head mounted display (HMD) system includes a display for emitting light toward an eye-ward side of the system and which allows both ambient light and emitted light to reach an eye of a user. The system provides augmented reality (AR) based viewing and includes a rotatable substrate supporting a set of light emitting elements (301). Each light emitting element is oriented toward a world side of the HMD system. A rotatable reflective surface is positioned on the world side of the set of the light emitting elements. The
(Continued)

reflective surface reflects emitted light toward a user eye. A motor, coupled to the rotatable substrate and the rotatable reflective surface, rotates these elements about a common axis and a display driver selectively activates the light emitting elements during this rotation in accordance with an illumination sequence so as to provide an image.

27 Claims, 8 Drawing Sheets

(58) Field of Classification Search
USPC .......................................................... 345/691
See application file for complete search history.

(56) References Cited

U.S. PATENT DOCUMENTS

| | | | |
|---|---|---|---|
| 2004/0155565 A1 | 8/2004 | Holder et al. | |
| 2010/0290127 A1* | 11/2010 | Kessler | G02B 27/0172 359/631 |
| 2011/0069157 A1* | 3/2011 | Ito | H04N 13/32 348/51 |
| 2013/0114146 A1* | 5/2013 | Larson | F16M 13/04 359/632 |
| 2014/0014919 A1* | 1/2014 | Na | H01L 27/3211 257/40 |
| 2014/0091942 A1* | 4/2014 | Matloff | G09G 3/002 340/815.53 |
| 2015/0126963 A1* | 5/2015 | Despa | G16H 40/63 604/506 |
| 2016/0314729 A1 | 10/2016 | Gutierrez | |
| 2016/0320616 A1 | 11/2016 | Ichii | |
| 2017/0171533 A1* | 6/2017 | Benitez | G02B 30/27 |
| 2017/0344112 A1* | 11/2017 | Wilson | G06F 3/0304 |
| 2018/0284459 A1* | 10/2018 | Calm | G02B 5/30 |
| 2019/0035317 A1* | 1/2019 | Rohena | F04D 25/0673 |
| 2019/0086665 A1* | 3/2019 | Pletenetskyy | G06F 3/011 |

FOREIGN PATENT DOCUMENTS

| | | |
|---|---|---|
| WO | 2006021788 A1 | 3/2006 |
| WO | 2016105283 A1 | 6/2016 |
| WO | 2017000522 A1 | 1/2017 |

OTHER PUBLICATIONS mspoweruser.com, "Truly scary HoloLens patent could offer 'practically unlimited' field of view", accessed on Apr. 11, 2019 from <<https://mspoweruser.com/truly-scary-hololens-patent-could-offer-practically-unlimited-field-of-view/>>, 24 pages.

International Preliminary Report on Patentability dated Apr. 15, 2021 for International Application No. PCT/US2019/054250, 8 pages.

European Examination Report dated Jun. 29, 2021 for EP Application No. 19 791 040.9, 6 pages.

Chinese Office Action dated Jul. 19, 2021 for CN Application No. 201980006357.1, 25 pages.

Translation of Chinese Office Action dated Jan. 29, 2022 for Chinese Application No. 201980006357.1, 7 pages.

* cited by examiner

HEAD MOUNTED DISPLAY WITH MECHANICAL SCANNING

CROSS-REFERENCE TO RELATED APPLICATIONS

The present application is a U.S. National Stage Application under 35 U.S.C. § 371 of International Patent Application Serial No. PCT/US2019/054250, entitled "HEAD MOUNTED DISPLAY WITH MECHANICAL SCANNING," filed on Oct. 2, 2019, which claims priority to U.S. Provisional Application No. 62/741,809, entitled "HEAD MOUNTED DISPLAY WITH MECHANICAL SCANNING," filed on Oct. 5, 2018, the entireties of which are incorporated by reference herein.

BACKGROUND

A head mounted display (HMD) is often used in augmented reality (AR) applications. The AR-type HMDs are able to project images to create two-dimensional and three-dimensional images. Many AR-type HMDs are bulky and cumbersome to wear and use due to complex arrangement of lenses, films, displays, and so forth. In fact, some conventional HMDs uses a set of light emitting diodes (LEDs) or other light sources arranged in a rectangular grid. While the LEDs and other electronic components have shrunk in size, each of these light sources requires a power line and are configured with an illumination signal that communicates to each LED when to illuminate. The light sources act as pixels that allow user eyes to see an image plotted in cartesian coordinates—an arrangement of orthogonal rows and columns of light emitting elements. This arrangement is relatively bulky and expensive to manufacture. Further, due to the inherent properties of optics combined with the conventional displays, projected images in AR-type HMDs are not crisp and well illuminated. When in the form of a two-dimensional opaque surface, conventional displays obscure some or all of the vision outside of the HMD thereby preventing AR-type vision or at least limiting field of view both vertically and horizontally. For example, some AR-type HMDs have a field of view somewhere between 30 and 40 degrees horizontally and even less field of view vertically. The limited field of view spoils the view of the world beyond the HMD.

SUMMARY

The invention relates to a head mounted display (HMD) system, for example a mechanical-based head mounted display (MHMD), including a substrate supporting a set of light emitting elements, wherein each light emitting element is oriented toward a world side of the HMD system; a reflective surface oriented toward a user eye; a motor coupled to the substrate and the reflective surface for motion of the substrate and reflective surface; and a display driver electrically coupled to the set of light emitting elements and configured to selectively activate the set of light emitting elements so as to generate an image during motion of the substrate and the reflective surface.

The HMD system may include a circular, transparent support for the reflective surface. For example, the circular, transparent support has a surface supporting the reflective surface, and wherein the reflective surface is spherically shaped with a center on an eye-ward side of the HMD system. The circular, transparent support may have a radius of curvature greater than 10 mm. The center of the reflective surface may be on an optical axis of the HMD system.

According to another embodiment of the invention, the light emitting elements are arranged in one column of light emitting elements along the substrate. Further, the light emitting elements may be arranged in two columns of light emitting elements, wherein the substrate supporting the light emitting elements is curved according to a constant or variable radius of curvature.

Furthermore, the HMD system may include an outer housing substantially enclosing the substrate and the reflective surface, and wherein the reflective surface is positioned on the world side of the set of the light emitting elements. The center of the substrate may be on an optical axis of the HMD system.

The substrate may have a surface supporting the light emitting elements and the surface is spherically shaped with a center on an eye-ward side of the HMD system. For example, the substrate has a spherically shaped surface supporting the light emitting elements and each of the light emitting elements is mounted substantially orthogonal to the spherically shaped surface.

Power may be supplied to the light emitting elements through induction.

According to another embodiment of the invention, the HMD system includes a bearing assembly; and a rotatable housing, wherein the substrate and the reflective surface are each coupled to the rotatable housing, and wherein the rotatable housing is coupled to a portion of the bearing assembly for rotation by the motor. The display driver may be mounted to the rotatable housing, and wherein the bearing assembly includes one of an air-suspended bearing and a magnetically-suspended bearing.

The motor may be a rim motor and rotation of the rotatable housing may be actuated at a rim of the rotatable housing.

The HMD system according to the invention may further include: a drive belt coupled to the motor; a bearing assembly; and a rotatable housing having a surface feature to engage with the drive belt, wherein the substrate and the reflective surface are each coupled to the rotatable housing, and wherein the rotatable housing is rotated by operation of the drive belt and the motor.

Some wearable HMDs overlay a digital image on top of a real world imagery or other real-world scene. Both the real world scene and the digital image appear visible to a user of these HMDs. This type of HMD is commonly called an augmented reality (AR) system or AR-based HMD. Described herein are e.g., embodiments of a mechanical-based head mounted display (MHMD) for use in providing AR display content in AR systems. In front of a user, an assembly operates a light-emitting device having a set of light emitting elements. According to certain embodiments, the scanning is performed by moving or rotating one or more components such as by a wiping or a rotational motion of an array of light-emitting components generally in front of the eyes of the user. In some embodiments, the motion is in line with or parallel to a same axis as the user eyes. This axis is referred to herein as an optical axis and can be centered generally in front of the fovea when the device is worn proximate to the eyes.

In the described embodiments of the AR system, an assembly (e.g., a HMD system) includes a set (e.g., an array, a two-dimensional array, a sequence) of light emitting elements, referred to herein broadly as LEDs for sake of convenience, as a display source. In certain embodiments, the LEDs emit light toward a world direction away from the user eyes. A reflective strip or mirrored area reflects the generated light back toward one or more eyes. The LEDs may be distributed radially along an area referred to herein as a light strip or emitter array and may be arranged in a linear path in the emitter array. Each LED along the emitter array may represent a row of components of a conventional display as the emitter array rotates or scans on its path as further explained herein. As the emitter array scans in front of the eye, the LEDs emit light from each new position as if the LEDs are part of a new column. This action creates a polar-coordinate-based image for combining with real world light entering the front of the MHMD when the LEDs are pathed in an arc or circle as further explained.

The invention also relates to a method to generate an augmented reality image in a head mounted display (HMD) system, the method includes: receiving an image signal by a display driver; generating light based on an illumination sequence by a set of light emitting elements controlled by the display driver, wherein the light emitting elements are disposed on a (e.g. rotatable) substrate and oriented toward a world side of the HMD; and moving (e.g. rotating) the substrate and a reflective surface oriented toward an eyeward side of the HMD and positioned on the world side of the set of the light emitting elements.

For example, the method includes: after receiving the image signal by the display driver, determining the illumination sequence for each element of the set of light emitting elements including at least one of a brightness and an illumination duration for each of the light emitting elements of the set of light emitting elements. Each light emitting element may include at least two subcomponents, wherein determining the illumination sequence for each element includes determining at least one of a brightness and an illumination duration for each subcomponent of each light emitting element of the set of light emitting elements. Subcomponents of each light emitting element may be positioned circumferentially with respect to one another, and wherein determining the illumination sequence for each light emitting element may include determining a timing offset for respective subcomponents of each light emitting element.

Further, determining the illumination sequence may include identifying an illumination duration for each of the light emitting elements based on a radial position of the respective light emitting element from a center of rotation. Determining the illumination sequence further may include identifying an illumination duration for each of the light emitting elements based on a rotational speed of the respective light emitting element around a center of rotation.

Rotating the substrate and the reflective surface may include determining a rotation speed based on the illumination sequence and rotating the rotatable substrate and the reflective surface based on the rotation speed. The rotatable substrate and the reflective surface may be rotated at a substantially constant rotational speed. Moreover, rotating the rotatable substrate and the reflective surface is performed by rotating a drive belt coupled to a motor and to a rotatable housing having an outer surface feature to engage with the drive belt. The rotatable substrate may have a surface supporting the light emitting elements and the surface is spherically shaped with a center on an eye-ward side of the HMD.

The embodiments of the method according to the invention described above can be of course combined with the embodiments of the HMD system according to the invention.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical components. Unless otherwise indicated, components and relations therebetween are not drawn to scale.

DETAILED DESCRIPTION

Figure 1:
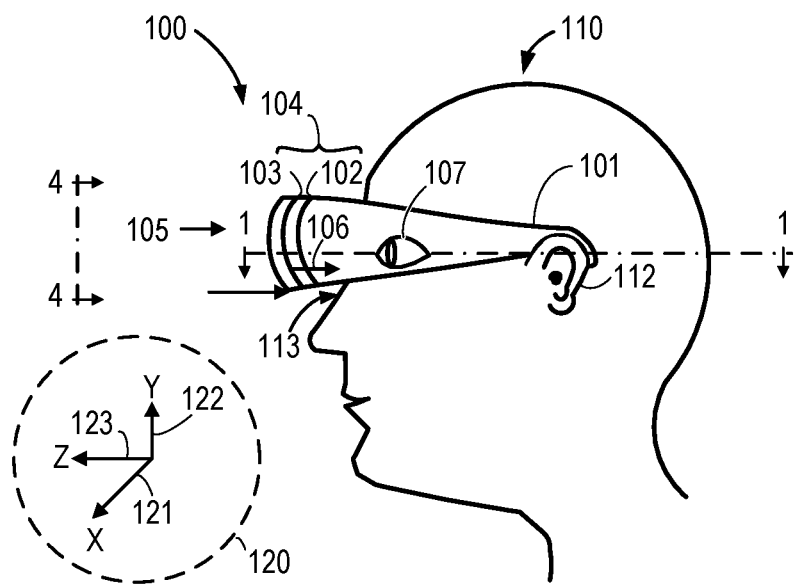
FIG. 1 is a simplified diagram of a side view of a mechanical-based head mounted display (MHMD) for implementation in AR systems in accordance with some embodiments.

FIG. 1 is a simplified diagram of a left side view of a mechanical-based head mounted display (MHMD) 100 for use in AR systems in accordance with some embodiments. Each of the elements of the MHMD 100 takes the form of one of various possible embodiments as further described herein. The MHMD 100 includes a frame 101 that supports a display subsystem 104. The display subsystem 104 is generally positioned in front of eyes 107 of a user 110. The display subsystem 104 operates in a similar fashion to a propeller and rotates at a speed such that the user 110 does not see the propeller but is able to see pixels or spots created by bright lights which ride on the propeller. In this regard, the display subsystem 104 includes at least one display panel 102 that produces light for one or both user eyes 107 of a user 110. The frame 101 includes one or more arms that extend from a front of the user 110 and rest on one or more ears 112 on a side of the user's head. A portion of the frame 101 rests on a bridge 113 of a nose of the user 110. A mirror 103 is positioned on a world-side of the display panel 102, and the mirror 103 reflects light 106 emitted from the display panel 102 toward the eyes 107. World-side ambient light 105 passes through a front side of the MHMD 100 to the eyes 107 of the user 110. Both the generated light 106 reflected back to the user 110 and the ambient light 105 are in a light path to an expected position of one or both user eyes 107. While a single line-based structure is illustrated for the display subsystem 104, in some implementations the display subsystem 104 is a composite structure that includes a plurality of components as further described herein.

A device coordinate system 120 provides a reference for the figures. According to some embodiments, each of the display panel 102 and the mirror 103 are curved along at least one of a first axis or dimension 121 labeled "X" and along a second axis 122 labeled "Y", the second axis 122 being different from the first directional axis 121. Unless otherwise indicated, horizontal and vertical are in reference to the figure and not with respect to the horizon or to gravity. One or more of the display panel 102 and the mirror 103 are curved to accommodate the geometry of the eyes 107 of the user 110.

The MHMD 100 can provide certain advantages over other types of AR-type HMDs. For example, the optical display subsystem 104 is monocentric. Certain optical elements such as the display panel 102 and the mirror 103 have a spherical shape in at least one dimension and a common center such as near a center of a pupil of a respective one of the eyes 107. Use of a spherical shape for one or more of the light source (display panel 102) and light reflecting mirror 103 avoids complex optical paths, distortion, and complex shapes for the optical elements which greatly simplifies manufacturing and assembly. Further, no refraction lens is required. Molded lenses are often complex and expensive to produce. Light paths through molded lenses can suffer efficiency losses thereby degrading a resulting image. Optical surfaces that are spherical in shape are generally easier to design, manufacture, and assemble thereby the display panel 102 and the mirror 103 are less expensive to produce and assemble than non-spherical components. In contrast to the display panel 102, conventional planar displays produce planar images, and planar sources travel through various non-spherical optical elements to produce a final image leading to optical distortions before the generated light reaches the eyes.

The display panel 102 includes one, two or a few columns of light emitting elements in the display panel 102 that form pixels of a resulting image when illuminated based on an input signal. This arrangement of light emitting elements reduces or eliminates a need for providing a complex set of signals to a two-dimensional (2D) array of light emitting elements of a conventional rectangular display. Instead, a 1×N or 2×N array of pixels is supported by a substrate and the light emitting elements are scanned (e.g., rotated, translated, windshield wiper swept in an intermittent back and forth motion). In some embodiments, each column is arranged in parallel with another column. In other embodiments, one or more of the columns of light emitting elements is off-center with respect to a point of reference (e.g., a center of rotation, a pinned, stationary point of a mechanical component) of an image-generating motion. Use of a few light emitting elements in the display panel 102 reduces cost compared to the conventional 2D display. Cost for a conventional 2D display typically scales with area. Use of an increased number of light emitting elements increases a risk of defect in a display. Fewer display elements per area per wafer reduces cost and complexity and also reduces a risk of encountering a manufacturing defect in the devices described herein relative to manufacturing of conventional displays.

Further, the MHMD 100 has a relatively high degree of transparency compared to other HMDs that employ several lens and other optic elements in the AR light path between the display and user eye. Having many optic elements reduces clarity. Many HMDs cannot display a digital image while allowing nearly complete transparency to the world in front of the user 110. Brightness of the light 106 from the light producing elements of the display panel 102 is extremely good relative to AR-based light provided by other designs. The MHMD 100 produces light and reflects the light once off of a first surface of the mirror 103 toward the eye 107. There is relatively low loss in the light path compared to some conventional techniques and designs. Further, image density or resolution can be relatively high at a center of vision of the display subsystem 104 and sparse near its perimeter. Thereby, the design of the MHMD 100 is inherently foveated such that more information is available at a center region of the MHMD 100 when lined up with a fovea of the user eye 107.

Figure 2:
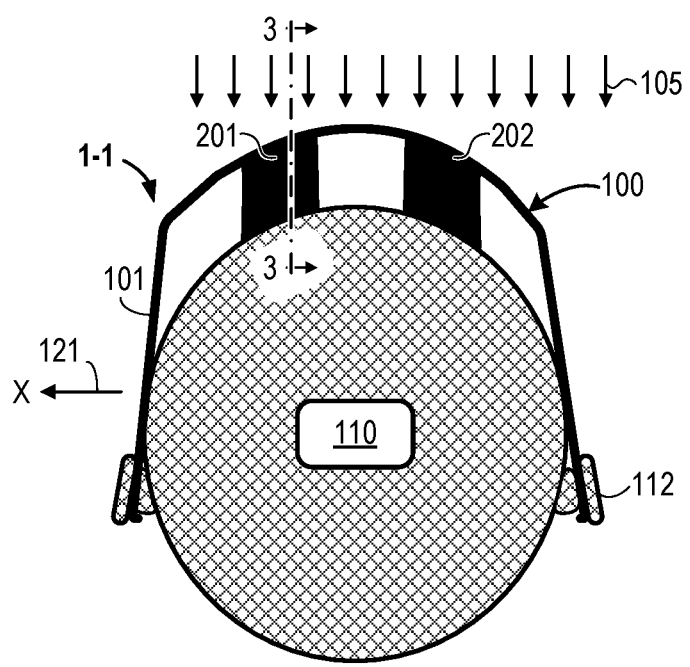
FIG. 2 is view of the MHMD of FIG. 1 in accordance with some embodiments.

FIG. 2 is view 1-1 of the MHMD 100. In the view 1-1, the frame 101 supports display subsystems 201, 202—embodiments of the display subsystem 104 of FIG. 1 in the MHMD 100 for each of the eyes 107. Each display subsystem 201, 202 includes the display 102 and the mirror 103. The display subsystem 201 is substantively similar to the display subsystem 202. The frame 101 rests at least on the ears 112 of the user 110. Each of the display panel 102 and mirror 103 of the display subsystems 201, 202 is curved along a first axis such as the first axis 121 and along a second axis according to a spherical design and a generally constant radius from a same center. Ambient light 105 passes through the display subsystems 201, 202 and reaches the eyes 107 of the user 110. Subsequent figures illustrate various components of the display subsystems 201, 202, including at least the display panel 102 and the mirror 103, in greater detail. The display panel 102 includes light emitting components typically found in such devices as a liquid crystal display (LCD), a thin film transistor (TFT) LCD display, a light emitting diode (LED) display, an organic LED (OLED) display, an active-matrix OLED (AMOLED) display, a plasma display, and an electroluminescent display.

Figure 3:
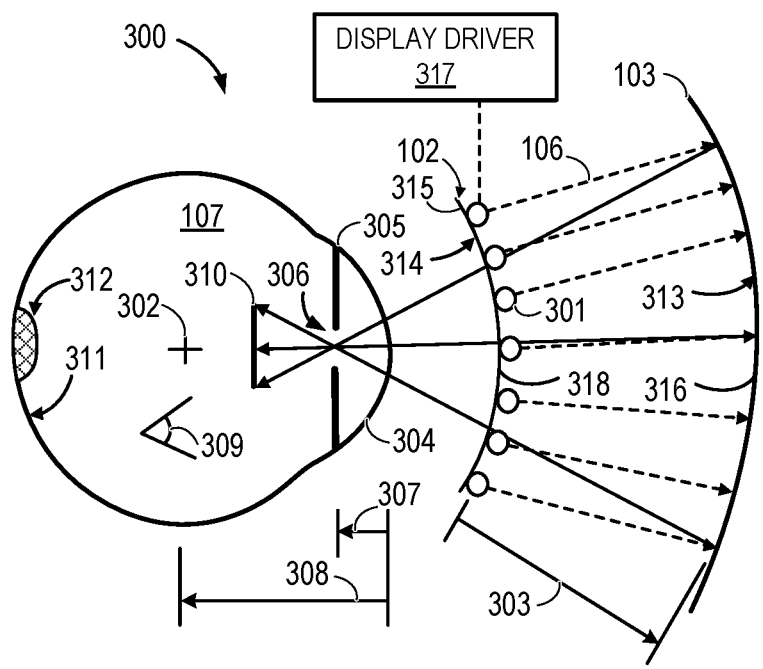
FIG. 3 is cross-sectional view of the MHMD of FIG. 2 in accordance with some embodiments.

FIG. 3 is view 3-3 in accordance with some embodiments illustrating an optical path of generated light 106 for the MHMD 100 between light emitting components 301 of the display panel 102 and a retina 311 at the back surface of the eye 107. The light emitting components 301 are part of an HMD system 300 and the components 301 form an array of light elements along a curvature 314 of the display panel 102. The display panel 102 includes one, two, three, four, or more electronic components or sections supported on one, two, three, or more arms, strips, or substrates 315. A curvature 313 of the mirror 103 and the curvature 314 of a surface 318 of the display panel 102 are generally spherical and are at respective radii as measured from a center of scanning 302 of the display subsystem 104. That is, the light emitting components 301 are arranged along a spherical path and are supported by the substrate 315. A display driver 317 powers and activates the light emitting components 301. By way of example, a radius of the first curvature 313 is greater than 10 mm (e.g., 45 mm, 50 mm, 55 mm), and a radius of the second curvature 314 is approximately 25 mm. Based on an orientation of the light emitting components 301, such as generally directed orthogonally to a surface of the display panel 102, the display subsystem 104 has a focal length (FL) of approximately 25 mm. Broadly, components such as the substrate 315 and the mirror 103 are rotatable and are referred to as rotatable components.

Light 106 leaves the display panel 102 and travels a distance 303 to the mirror 103 and is reflected from a reflective surface 316 of the mirror 103 toward the eye 107.

Light 106 enters a cornea 304 and passes through a pupil 306 formed by an iris 305 of the eye 107. A first distance 307 is measured between a front surface of the cornea 304 to the iris 305 and is approximately 3 mm. A second distance 308 from the front surface of the cornea 304 to the center of scanning 302 is approximate 13 mm. A distance between the front surface of the cornea 304 to the display panel 102 is referred to as eye relief and is approximately 12 mm. An image 310 is formed from the light 106 passing into the eye 107 as represented by a vertical line. In actuality, the image 310 is formed at the retina 311 and generally in a fovea 312 of the retina 311 where the fovea 312 is a curved surface. Based on dimensions of the various components including the display panel 102 and the mirror 103, the formed image 310 has a vertical field of view (FOV) 309 of approximately 40 degrees. Such FOV 309 is an improvement over conventional AR-based HMD. By flashing light 106 outward from the display panel 102, light 106 bounces back toward the eye 107 from a concave spherical mirror or reflective strip—illustrated as the mirror 103—and the image 110 is concentrated at and through the pupil 306 and perceived by the user 110.

Figure 4:
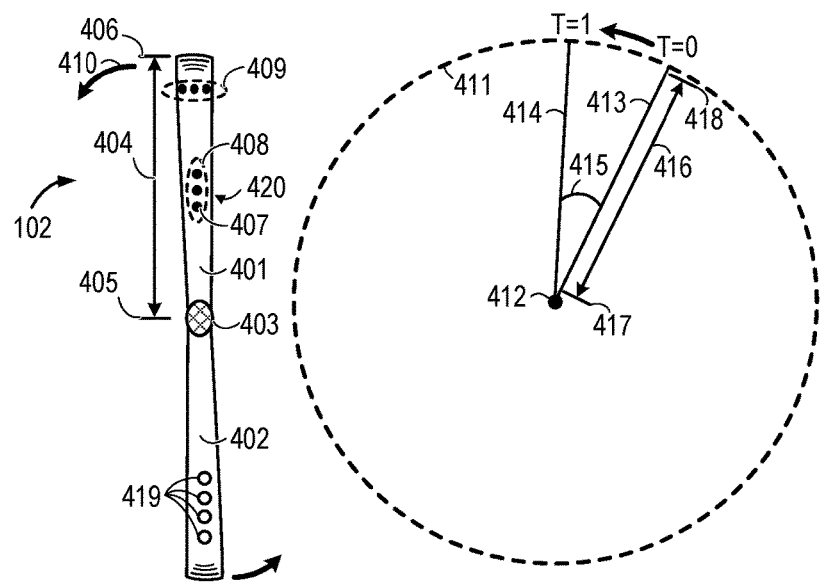
FIG. 4 is view of a display of the MHMD of FIG. 1 in accordance with some embodiments.

FIG. 4 is view 4-4 of the display panel 102 in accordance with some embodiments. The display panel 102 is illustrated vertically and includes a first radial arm 401 extending above a center region 403 and a second radial arm 402 extending below the center region 403. In some embodiments, the center region 403 takes the form of a nose cone depending on a structural mechanism for the radial arms 401, 402. Each radial arm 401, 402 extends an arm length 404 from a center position 405 to an outer position 406. In width, each radial arm 401, 402 is only a plurality of millimeters. At any given time, as the radial arms 401, 402 move, at least 90 percent of the area swept by the arms is completely unobstructed to receive ambient light.

The radial arms 401, 402 form a generally continuous strip of material from a top to a bottom of the display. Together, the first and second strips 401, 402 form a display support structure referred to generally as a single blade. Light emitting elements 407 are arranged on each of the radial arms 401, 402. The radial arms 401, 402 support the light elements 407 and, optionally, a substrate (not illustrated) supports the radial arms 401, 402. For sake of convenience in illustration, only a few elements 407 are illustrated. The radial arms 401, 402 are densely provided with light emitting elements 407 and are provided conductive traces to deliver power and an operation signal to these elements 407. In certain embodiments, the image signal is digital and is provided in the form of a signal carrying bits of data. In other embodiments, the image signal to the light emitting elements 407 is analog.

Each radial arm 401, 402 is curved according to a spherical curvature from the center position 405 to the outer position 406. In some embodiments, each of the light emitting elements 407 are positioned orthogonal to a surface of the arms 401, 402. Typically, the light emitting elements 407 are arranged in groups such as one red, one green, and one blue light emitting element 407 per group to form an overall light emitting component or set of subcomponents 420. In a first example, the elements 407 are arranged vertically with respect to one another in a first type of group 408. In a second example, the light emitting elements 407 are arranged horizontally or circumferentially (e.g., curved along a fixed or variable length radius) on the radial arms 401, 402 with respect to one another in a second type of group 409. When arranged according to the second type of group 409, the subpixels can be operated sequentially, and the subpixel colors can additively provide color photons at a particular point to build a full color pixel at that point in space, and this activity can occur at a particular first data transfer rate that is reduced when compared to flashing all subpixels at a same time at a same moment in time. Thus, the second type of group 409 offers one or more characteristics different than those of the first type of group 408.

The first and second types of groups 408, 409 can be arranged in one, two, or more columns 419, in one, two, or more rows (not illustrated), or in a combination of one or more columns with one or more rows of groups of light emitting elements. The display panel includes one, two, or a few columns of light emitting elements combined with one, two, or a few rows of light emitting elements where the row or rows are arranged perpendicularly to the one or more columns of light emitting elements or at a non-perpendicular angle with respect to the one or more columns of light emitting elements so as to provide a densely light-rich resulting image for the user eyes. For example, the display panel 102 includes one column and one row of light emitting elements arranged on the radial arm 401. In some implementations, the groups 408, 409 are not centered or symmetric around a center of rotation 412. This arrangement introduces a bit of additional complexity but allows for pass-through at the center of rotation 412 where the user's view of the world would be blocked by an opaque mirror center in other implementations. In some embodiments, the groups 408, 409 are arranged in columns. In certain arrangements, the columns are parallel with one another on the radial arm 401. In some arrangements, the columns are arranged off-center with respect to the center of rotation 412.

The elements 407 of the groups 408, 409 are referred to as subpixels. Together, a group of subpixels form a pixel, and a collection of pixels, when the display panel 102 is operated, form a polar coordinate-based RGB display. When groups 408, 409 include subpixels of one or two colors or hues, AR-based information is provided to a user as an image in a reduced color-set format.

The radial arms 401, 402 are operated (e.g., rotated, swept) in a first direction 410, such as counter-clockwise as illustrated. The operation can be at a fixed rotational speed or the speed may vary over time according to an image data transfer signal and operation of a motor as needed to deliver a desired resulting image for human perception. While the arms 401, 402 are operated, the light emitting elements 407 emit light according to a control signal and a power source described in relation to other figures. While emitting light or not, the elements 407 pass along a racetrack path circumferentially around the center of rotation 412 as illustrated by a first racetrack path 411 at the outer position 406 of the arms 401, 402. The racetrack path alternatively can be referred to as a row in polar coordinate space. The light emitting elements 407 are positioned or formed on the arms 401, 402 from a first inner position 417 to a distal outer position 418 along a usable length of the radial arms 401, 402 where light emitting elements can be secured to the radial arms 401, 402. In some embodiments, the first inner position 417 is at the center of rotation 412. A set of rows of elements forms a polar-coordinate-based display to create an image for the user.

When in motion, the first radial arm 401 is located at a first position represented by a first radius 413 at a first time T=0. In a unit of time Δt, the first radial arm 401 has moved as illustrated by a number of degrees 415 (or a fraction of a degree) to a second position represented by a second radius 414 at a second time T=1. This movement or scanning operation is referred to as a rotational amount AG as measured in radians or degrees. Each of the light emitting elements 407 are effectively in an ON state or OFF state one or more times from the first time T=0 to the second time T=1. The light emitting elements 407 thereby provide light to a user eye (not illustrated) while at the same time allowing ambient light to pass by the arms 401, 402 thereby providing an AR-based image and AR-based vision to the user. In certain embodiments, the radial arms 401, 402 pass through 360 degrees of rotation, and the light emitting elements 407 pass locations in a full field of view. As the light emitting elements 407, the light emitting elements can fire at specific times to paint an entire light image.

Figure 5:
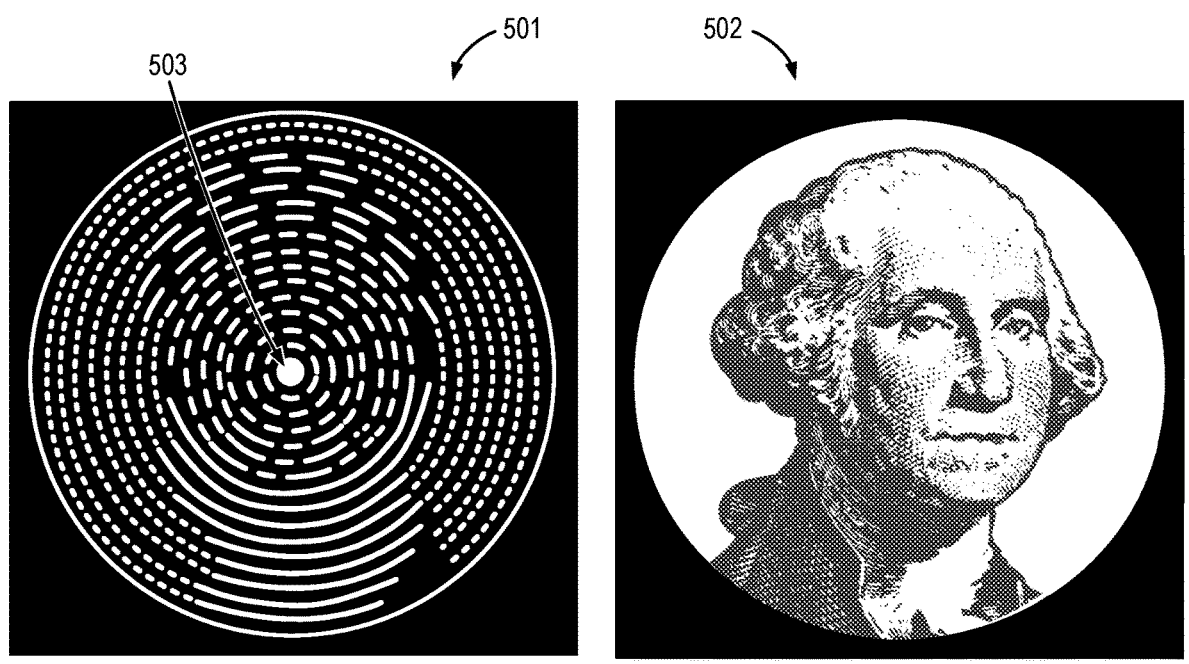
FIG. 5 is a graphical representation of two images produced by operation of an MHMD in accordance with some embodiments.

FIG. 5 is a graphical representation of an image 501 and an image 502 produced by scanning of an MHMD, such as the MHMD 100, in accordance with some embodiments. The first image 501 is at a first pixel resolution less than a second pixel resolution of the second image 502. For example, the first image 501 is illustrated and represents an image having 16 circular rows where electronic elements fire 64 times per revolution with the radial arms 401, 402 each spinning or scanning at a first speed measured and communicated as a number of revolutions of the radial arms 401, 402 per unit of time. The second image 502 is illustrated and represents an image having 200 circular rows where electronic elements selectively fire 128 times per revolution with the radial arms 401, 402 spinning at a second speed measured and communicated as a number of revolutions of the radial arms 401, 402 per unit of time. In some embodiments, the first speed and the second speed are substantially equal.

A maximum resolution or position that human eyes can resolve is approximately 1/60 of a degree vertically. For a 40 degree field of view (FOV), as measured vertically, this leads to a light array having approximately 2,400 points of light from one side to another side of the resulting image. For 2,400 LEDs (devices) per column, where each device includes three color subpixels, and each subpixel requires up to 8 bits of data of color depth (data), and each subpixel operates at approximately 86 kHz, an image data transmission rate of approximately 5 GHz is needed to generate a particular image. For certain images, it is possible to slow down one or more of a refresh frequency and a speed of scanning of the light array to a lower data rate that must be sustained in order to achieve a particular image of a particular pixel density.

In FIG. 5, contents of the images 501, 502 each represents the same subject matter. Due to limitations of illustration, these images 501, 502 are illustrated in black and white but typically, in practice, would be in color with RGB subpixels producing light in various hues at the various pixel locations. The first and second images 501, 502 show how a user would see and perceive an image instead of the radial arms 401, 402 in the display subsystem 104 due to the scanning or motion of the radial arms 401, 402. The human visual system would not perceive the radial arms 401, 402 due to the motion of these components and due to light entering the eye by bypassing the radial arms 401, 402 as the radial arms 401, 402 operate. In some embodiments, due to a presence of a nose cone or lack of light emitting elements at or near a center of the display panel 102, an absence of detail is evident at a center region 503 of the first image 501. In practice, this region 503 would be reduced as much as possible for esthetic purposes.

In some embodiments, a pixel size in the images 501, 502 depends on multiple factors including a radial location along the radial arms 401, 402; a pixel pitch relative to a surface of the radial arm 401, 402; a lens, filter, or mask between the light emitting elements and user eye, and a firing frequency for the pixel. As an example, a pixel size is proportional to a radius position, abbreviated as radius "r" along the radial arms 401, 402. To find the actual pixel size, the radius position r is multiplied by an LED radial pitch and multiplied by a pie wedge angle. LED refers to a light emitting diode as an example of a light emitting element. The pie wedge angle can be determined by a scanning or operational speed of the LED divided by a flashing frequency and noting that light is emitted over a tiny arc referred to as the pie wedge angle.

In terms of data rates, for each of the images 501, 502, each pixel is associated with a single light intensity value— an amount of light emitted over a small time window in which a user eye perceives the light as a single point of light as the LED travels in its circular path in the MHMD. A refresh frequency is proportional to a translational or scanning speed of the LED. A sufficient effective display for producing the image 502 having a high degree of detail is approximately a column of 1,440 points and flashing these points 1,440 times per rotation to effectively create 1,440 rows. For 1,440 flashes per revolution, and based on 60 revolutions of each LED per second, the image 502 requires an image signal having approximately an 86 kHz data rate or column flash frequency per pixel where each pixel can be flashed for approximately 12 milliseconds (ms). For the MHMD, there are approximately 1,440 LEDs arranged in a column, and each LED includes three (3) subpixels or color components and each of these subpixels uses 8 bits to encode each subpixel color depth. For the image 502, for the 1,440 LEDs and the 86 kHz for each of the points, the image 502 would require a data transfer rate of approximately 3 GHz to sustain the image 502 in front of the user eye where all pixels are used to create the image 502.

Figure 6:
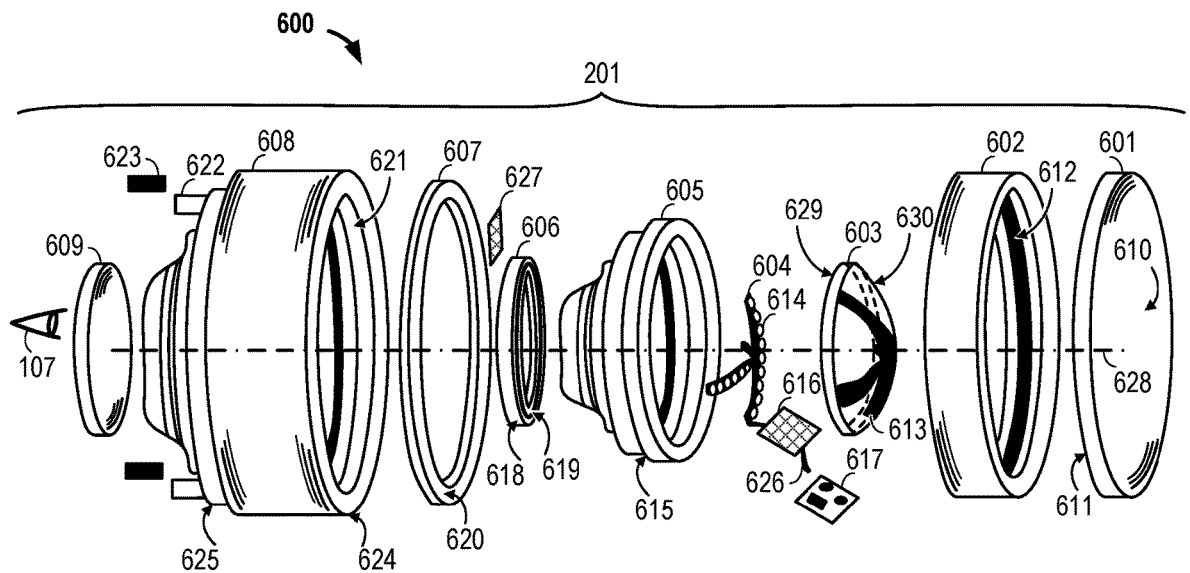
FIG. 6 is an exploded perspective view of a display subsystem in accordance with some embodiments.

FIG. 6 is a front exploded perspective view 600 of the display subsystem 201 in accordance with some embodiments. The subsystem 201 includes various components in front of the user eye 107 including: a first lens 601, a rim motor 602, a mirror shell 603, a light-producing armature 604, a rotatable housing 605, a bearing assembly 606, a printed circuit board (PCB) 607, an outer housing 608, and a second lens 609 on an eye-ward side of the subsystem 201. Other components include one or more of: a mounting plate 616, an electronic driver 617, a power brush 623, an electrical lead 626 (e.g., wiring), and an interposer 627 to keep components flush with one another and vibration free. These components are mounted to or into the outer housing 608 to form an assembled display subsystem such as subsystems 201, 202.

In certain embodiments, each of the first lens 601 and the second lens 609 is substantially flat, of uniform thickness, and includes a first, outer surface 610 and a second, inner surface 611. In other embodiments, the first and second lenses 601, 609 are refractive or otherwise alter a characteristic or path of the light to the user eye 107 such as by providing a magnification by way of a refraction or providing a correction for an astigmatism. When the display subsystem 201 is assembled, the inner surface 611 of the cover lens 601 is positioned against or adjacent to the rim motor 602 preferably inside a front edge or lip of the outer housing 608. The cover lens 601 and inner lens 609 are made of a safe and transparent material such as a glass or a plastic.

The rim motor 602 includes a slot 612 running inside and around an interior perimeter of the rim motor 602. The slot 612 is contoured and formed to receive a corresponding outer rim or portion of the rotatable housing 605. That is, the rim motor 602 remains stationary relative to the outer housing 608 and the rotatable housing 605, and components fixed thereto, scan within and relative to the outer housing 608.

The mirror shell 603 is formed of a transparent material. In some embodiments, the mirror shell 603 is made of a clear plastic. The mirror shell 603 includes at least one mirrored area 613 that extends from a first position to a second position over a spherically-shaped inner or outer surface of the shell 603. The mirrored area 613 has a uniform or variable width along its length. In some embodiments, a surface of the mirrored area 613 magnifies light when the light is reflected to the user eye 107. A resulting image is thereby magnified. In certain embodiments, the surface of the mirrored area 613 is non-planar in one or two directions. In shape, the mirrored area is a stripe of constant width, a bowtie with a first width at a first side narrower than a second width at a second side in opposing directions along the mirror shell 603, or a wedge shape with a first width at a first side narrower than a second width at a second side in a first direction along the mirror shell 603. The shell 603 is a transparent substrate or support for the mirrored area 613. In some embodiments, the mirrored strip 613 extends along a diameter path on the inner surface 629 or outer surface 630 of the shell 603. In certain embodiments, the strip 613 includes a geometric center of the shell 603 at an optical axis and geometric center 628 passing through the display subsystem 201.

The mirrored area 613 and the shell 603 are positioned to coordinate with a position of the light-producing armature 604. The light-producing armature 604 includes a set of light emitting elements 614. As illustrated, the armature 604 includes four arms, and each arm bears light emitting elements 614. The mirrored area 613 generally corresponds to each region overlaying the set of light emitting elements 614 in the light path. As illustrated, the mirrored area 613 has four arms corresponding to the four arms of the light-producing armature 604 bearing the set of light emitting elements 614. In at least some embodiments, each of the arms of the light-producing armature 604 is spherically curved in shape such that the arms of the light-producing armature 604 are curved according to a constant radius about a central point. The mirrored area 613 is wider than the light-producing armature 604 or offset from the same along one or more axis or dimension 121-123 so that at least some of the light from the light-producing armature 604 reaches the eye 107 unimpeded. The light emitting elements 614 are mounted to the light-producing armature 604 generally along a spherically shaped path. This spherically shaped path coordinates and is aligned with a spherically shaped surface of the mirrored area 613.

The light emitting elements 614 are powered and controlled by the electronic driver 617. The electronic driver 617 is shaped to match a shape of the mounting plate 616 and the electronic driver 617 is assembled in the subsystem 201 at the mounting plate 616. The shell 603, the light-producing armature 604, one or more wires 626, the mounting plate 616, and the electronic driver 617 are mounted to the rotatable housing 605. The one or more wires 626 facilitate delivery of a display signal from an external computer (not illustrated) to the electronic driver 617 that controls operation of light elements of the light-producing armature 604.

The bearing assembly 606 includes an inner race 619 and an outer race 618. The inner race 619 is mounted to a rim or surface 615 of the rotatable housing 605 and the inner race 619 runs against the outer race 618 thereby creating a smoothly scanning mechanism for the display subsystem 201. The bearing assembly 606 includes one or more rollers to facilitate movement of the inner race 619 relative to the outer race 618. The outer race 618 is mounted in an interior 621 of the outer housing 608 at a proximal end 625 thereof. During assembly, components are generally placed in the outer housing 608 from a distal end 624 of the housing 608. During operation of the subsystem 201, the outer race 618 remains stationary relative to the housing 608. One or more interposers 627 facilitate a strong, secure, and consistent placement of the bearing assembly 606 inside of the housing 608. While a roller-based bearing assembly is illustrated, other types of bearings can be used. For example, the bearing assembly 606 includes one of: an air-suspended bearing, and a magnetically-suspended bearing. Each display subsystem 201 can include one, two, or more bearings or bearing assemblies such as the bearing assembly 606 so as to facilitate smooth operation of the same.

The PCB 607 also is mounted in the interior 621 of the housing 608. The PCB 607 remains stationary as the rotatable housing 605 spins inside of the housing 608. The PCB 607 facilitates delivery of a signal to the electronic driver 617 and provides power to the same through one or more power brushes 623 mounted into the housing 608. The signal and power are provided to the light-producing armature 604 at a front surface 620 of the PCB 607 as the rotatable housing 605 spins inside of the housing 608. In other embodiments, the signal and power are provided by electrical induction coupling or other mechanism thereby simplifying a number of components subject to wear. One or more fastener housings 622 are formed in the outer housing 608 to facilitate and protect fasteners (e.g., screws, pins) that hold one or more of the various components together in the display subsystem 201.

Figure 7:
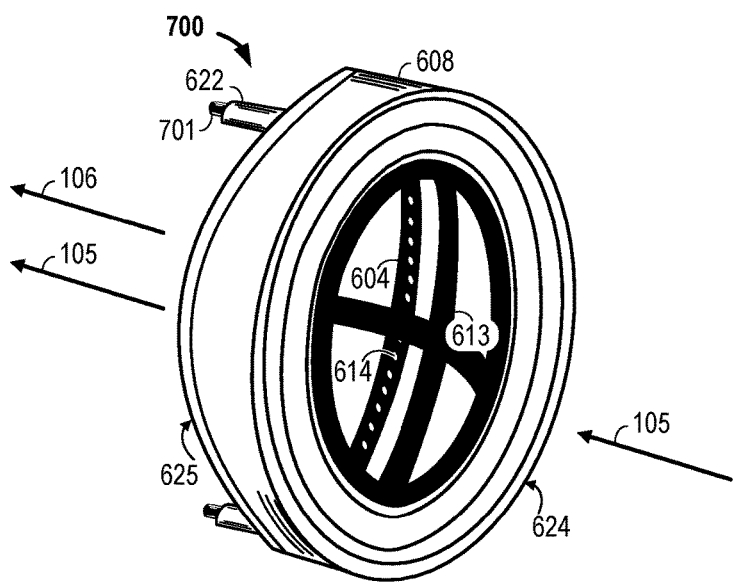
FIG. 7 is a perspective view of an assembled display subsystem of FIG. 6 in accordance with some embodiments.

FIG. 7 is a perspective view of an assembled display subsystem 700 in accordance with some embodiments. The assembled display subsystem 700 is one embodiment of the display subsystems 201, 202 described above. The various components of the subsystem 700 have been assembled together and positioned inside of the outer housing 608. An interior of the subsystem 700 is substantially open and transparent. Ambient light 105 passes into and through the distal end 624 and to the proximal end 625 of the housing 608. Light 106 emitted from the light emitting elements 614 of the light-producing armature 604 reflects from the mirrored area 613 and exits from the proximal end 625 of the housing 608. a mounting component 701 extends from the fastener housing 622 and would be coupled to the frame 101 of the MHMD 100 when assembled thereto.

In operation, the inner housing spins and the display subsystem 700 produces a generally circular AR-based image such as the images 501, 502. A user (not illustrated) wearing a pair of the display subsystem 700 would experience a view having a very high brightness in the reflected images 501, 502 because few elements exist in a light path between the light emitting elements 614 and the user eye. That is, only a few components are in the light path such as the light emitting elements 614 and the highly reflective surface of the mirrored area 613 and many of the components in the light path are not visible by the user as the housing operates (e.g., scans, operates, moves). Further, this AR-based subsystem 700 is inexpensive to produce and assemble. Each assembled display subsystem 700 is monocentric and foveated. A normally expensive two-dimensional display is replaced with a scanning 1×N light-producing strip or area. A second shell is a spherical, clear plastic shell on which the light-producing armature 604 is mounted and the light emitting elements 614 are arranged in a simpler, generally strip-shaped region of lights. One challenge is finding a rotatable or operational bearing assembly 606 that is quiet enough for continued, unobtrusive use of the display subsystem 201 having movable parts proximate to a user's face. In certain embodiments, the signal to flash the light emitting elements 614 is provided wirelessly to the electronic driver 617 to control the same so as to reduce an amount of wiring between components to the extent possible.

Figure 8:
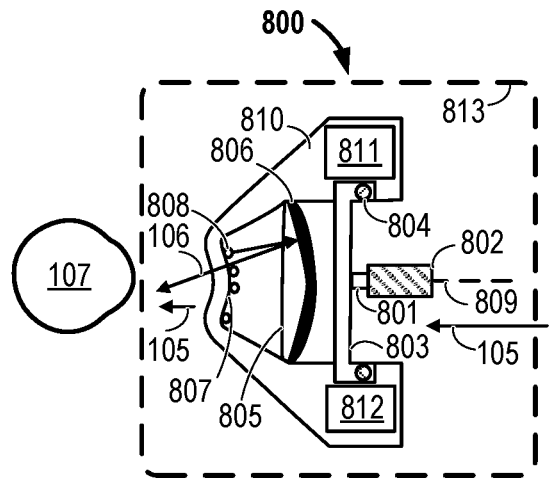
FIG. 8 is a side cross-sectional view of an assembled display subsystem in accordance with other embodiments.

FIG. 8 is a side cross-sectional view of an assembled display subsystem 800 in accordance with other embodiments. The subsystem 800 includes components mounted to a shaft 801 where the shaft 801 as part of a spindle is rotatable in and by a motor 802. The components include an arm 803 coupled to the shaft 801 at a central region of the arm 803 and to a housing 810 at distal ends of the arm 803 by one or more fasteners 804 such as pins or screws. A transparent spherically-curved shell 805 is coupled to the shaft 801. The shell 805 includes a mirrored area 806 of spherical curvature. A spherically curved surface 807 of the housing supports a set of light emitting elements 808 oriented toward the mirrored area 806. The light emitting elements 808 create light 106 to form an image for the eye 107 when the subsystem 800 is rotated. While only a few light emitting elements 808 are illustrated, the surface 807 of the housing 810 would be densely packed with light emitting elements 808 to create an image of a desired resolution. For example, a set of 1,440 light emitting elements 808 are provided on the curved surface 807.

Ambient light 105 passes into and through the display subsystem 800 thereby allowing the subsystem 800 to be part of an AR-based vision system. The housing 810 provides support for various other components to complete the subsystem 800 including a battery 811 and various electronic components 812 including a PCB that provide a support, power, and a signal to the set of light emitting elements 808. When assembled, the display subsystem 800 would be mounted inside or to a frame 813 of an MHMD such as the MHMD 100. An image producing component exterior to the subsystem 800 provides a signal to the electronic components 812 which would then operate the light emitting elements 808. In operation, the various components spin around a central axis 809 of the shaft 801. The subsystem 800 thereby produces a generally circular AR-based image such as the images 501, 502.

Figure 9:
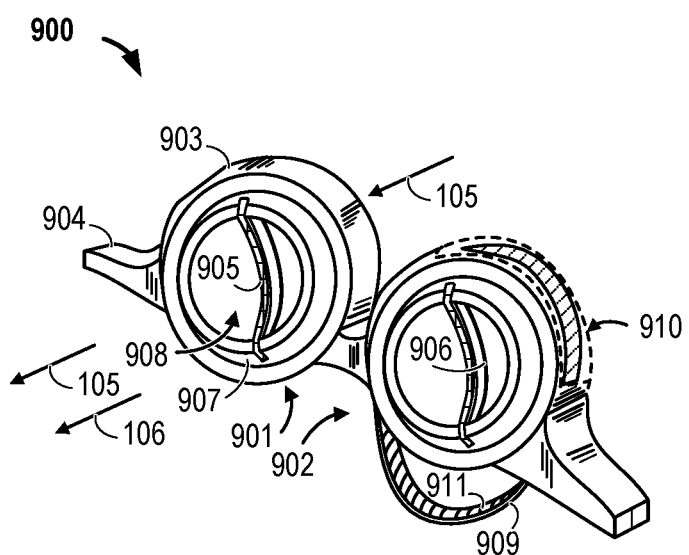
FIG. 9 is a perspective view of an display subsystem in accordance with additional embodiments.

FIG. 9 is a perspective view of an MHMD display subsystem 900 in accordance with additional embodiments. The subsystem 900 includes a first display subsystem 901 and a second display subsystem 902 for left and right eyes of a user (not illustrated) for a binocular AR vision system. The subsystem 900 would form part of a complete MHMD whereby moving parts are shielded inside of a housing. In particular, each subsystem 901, 902 includes a housing 903 in which certain components are mounted and operated. The housings 903 are held in place relative to each other by a supportive frame 904. The housings 903 protect internal components.

Each subsystem 901, 902 is similar to the assembled display subsystem 700. Each subsystem 901, 902 includes an inner component 908 having a bezel 907 that couples with a spherically shaped arm 905 for supporting light emitting elements directed toward a respective mirrored area 906 at an interior of the housing 903. The mirrored area 906 is also spherically shaped with a curvature matched to a curvature of the arm 905. The area 906 reflect the generated light 106 toward the eyes of the user. Ambient light 105 passes unobstructed through the first and second display subsystems 901, 902. The ambient light 105 and the light 106 produced by the subsystems 901, 902 form AR-based vision.

Each inner component 908 is operated by a drive belt 909 encircling at least a portion of the inner component 908 as illustrated inside of a cutout 910 of the housing 903. For sake of convenience, only the single drive belt 909 is illustrated for the subsystem 902. In operation, a belt actuates the subsystems 901, 902. That is, the same drive belt 909 would operate both subsystems 901, 902. Alternatively, a first belt would separately operate the subsystem 901 at a similar rate as the subsystem 902 operated by a second belt such as by coupling the belts to a same motor. A first, inner surface of the drive belt 909 includes ridges 911 as examples of a surface features that engage a matching surface feature in an outer surface of the inner component 908 thereby allowing one or more motors (not illustrated) to operate the belts and the inner components 908 in the subsystems 901, 902. In some embodiments, the subsystems 901 and 902 are rotated by the same or different motors in different directions (e.g., rotating the first subsystem 901 clockwise and the second subsystem 902 counterclockwise). Such operation cancels the rotational inertia generated by rotation of the subsystems 901, 902. When the user accelerates the system 900 with head motion, the rotational inertia of the subsystems 901, 902 would generally cancel each other and the user would feel less resistance to motion.

An image producing component exterior to the subsystems 901, 902 would provide a signal to the electronic components therein which would then operate the light emitting elements on the arms 905 to produce a generally circular AR-based image such as the images 501, 502 when the MHMD display subsystem 900 is placed in front of the eyes of the user.

Figure 10:
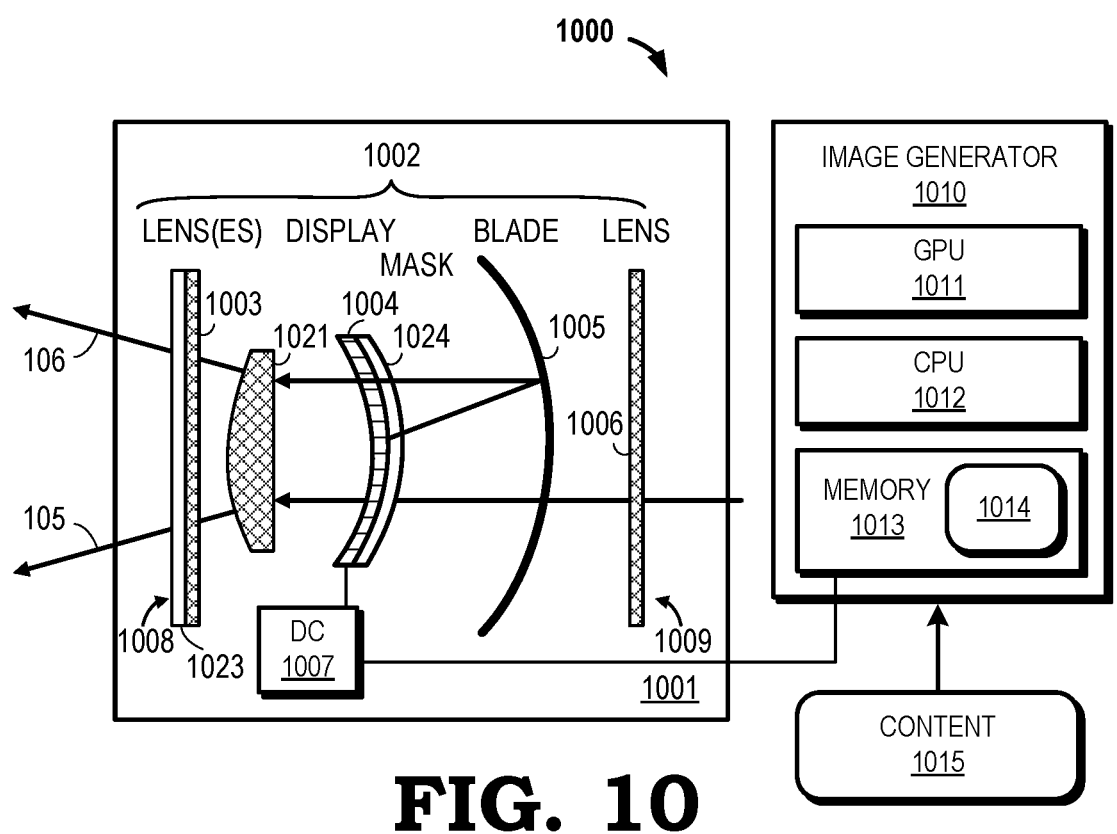
FIG. 10 is a block schematic diagram of an MHMD and an image generator in accordance with some embodiments.

FIG. 10 is a block schematic diagram of a system 1000 of an MHMD 1001 coupled to an image generator 1010 in accordance with some embodiments. The MHMD 1001 includes various components including, from left to right, a filter 1023, a first lens 1003, a third lens 1021, a display 1004, a mask 1024, a mirrored area, blade or strip 1005, and a second lens 1006. The first lens 1003 is at an eye-ward side 1008 of an image projecting subsystem 1002 and the second lens 1006 is at a world side 1009. Generated light 106 originates from the display 1004, passes through the mask 1024, and is reflected from the area 1005 before passing through the third lens 1021, through the first lens 1003 and the filter 1023, and to the user eye (not illustrated) at the eye-ward side 1008 of the MHMD 1001. The mask 1024 and the filter 1023 change one or more characteristics of the generated light 106 in the system such as polarity, intensity, focus, diffusion, bokeh, and depth of field. For example, a mask pattern of the mask 1024 has a uniform arrangement of openings, a varied pattern of openings such as relatively small holes near a center of rotation and progressively larger holes at a perimeter. The mask pattern can include apertures, each aperture having a particular shape such as a rectangular slot, a square, and a semi-circle where an edge of the aperture is diffused. In some embodiments, the third lens 1021 is a refractive optical element that decreases or increases a size of a resulting image from the generated light 106 at the eye-ward side 1008 of the MHMD 1001. In certain embodiments, the third lens 1021 focuses the light for the user. Ambient light 105 passes through the MHMD 1001 from the world side 1009 to the eye-ward side 1008.

In some embodiments, the display 1004 is stationary, planar in at least one dimension, and circularly-curved in shape in another dimension and one or more of the area

1005, the mask 1024, the display 1004, and the third lens 1021 rotate or otherwise operates. As the light producing elements of the display 1004 blink, the area 1005 reflects light to the user eye thereby creating a circular resulting image. In other embodiments, and as illustrated, the display 1004 is curved in a first dimension and linear in shape in a second dimension, and at least the display 1004 and the area 1005 are operated. As the light producing elements of the display 1004 blink, the area 1005 reflects light to the user eye thereby creating a circular resulting image. Thus, more than one variation of a set of stationary and movable components, when combined, is available to produce images as described herein.

Figure 11:
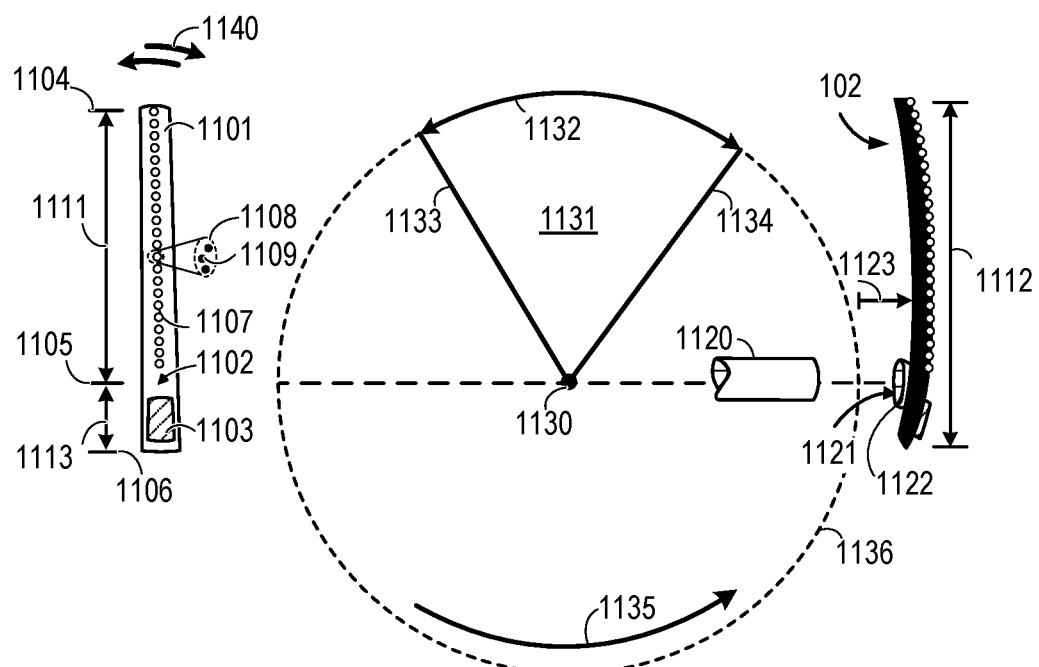
FIG. 11 is view of a display of the MHMD of FIG. 1 in accordance with other embodiments.

In the MHMD 1001, a display controller 1007 labeled DC operates light emitting elements of the display 1004. The display controller 1007 receives a signal from the image generator 1010. The image generator 1010 includes one or more various components to produce the signal. For example, the image generator 1010 includes a graphics processing unit (GPU) 1011, a central processing unit (CPU) 1012, and a memory 1013. The memory 1013 stores instructions 1014 executed by the components of the image generator 1010 such as the GPU 1011, the CPU 1012, or a combination of the same. In some embodiments, the image generator 1010 generates the signal provided to the display controller 1007 based on the instructions 1014. For example, the instructions provide a computer generated object for a video game or an AR-based object. In other embodiments, the image generator 1010 receives content 1015 from an input device such as a camera or network interface card (not illustrated). In turn, the image generator 1010 processes the content 1015 and provides the signal to the display controller 1007 based on the instructions 1014 and based on the content 1015. FIG. 11 is view 4-4 of the display panel 102 in accordance with additional embodiments. The display panel 102 is illustrated vertically according to a front view on a left side and a side view on a right side of the view 4-4. The display panel 102 includes a radial arm 1101 extending generally above and below a center region 1102 of the arm 1101. The arm 1101 has an overall length 1112 extending from a proximal end 1106 past a center of gravity in the center region 1102 to a distal end 1104. An upper portion of the arm 1101 extends a first distance 1111 from the center of gravity 1105 that is greater than a second distance 1113 which extends from the center of gravity 1105 to the proximal end 1106. The upper portion bears light emitting elements 1107 generally along a linear path from the center of gravity 1105 to the distal end 1104. Each light emitting element 1107, as indicated in the call-out 1108, includes a plurality of light emitting components 1109 of a particular wavelength of light or set of wavelengths associated with a particular light component for forming a light emitting element 1107. In this example, the light emitting components 1109 are formed in a generally triangular pattern based on one or more factors such as ease of construction, cost of construction, and so forth.

The radial arm 1101 includes one or more counterweights at, near, or below the center region 1102 to counter-balance the arm 1101. For convenience of illustration, a single counterweight 1103 is illustrated. That is, during scanning of the radial arm 1101, the counterweight 1103 balances the forces in the various components of the device including those in the radial arm 1101. The counterweight 1103 is mounted proximate to or below a center of rotation 1130 for the display panel 102. An axle 1120 runs through the center of rotation 1130 and is mounted to the display panel 102 at a mount point 1121 such as with a mounting structure 1122.

In some embodiments, the mounting structure 1122 is part of the axle 1120 or part of the radial arm 1101 itself. The counterweight 1103 facilitates smooth movement of the radial arm 1101 through a set of lateral motions as indicated by the arrows 1140. In some embodiments, the display panel 102 wags left and right such that the arm 1101 sweeps through an arc 1132 indicating the motion of the distal end 1104 of the arm 1101. The light emitting elements 1107 would then illuminate and provide an image within a wedge-shaped region 1131 from a first radius 1133 to a second radius 1134. In other embodiments where the arm 1101 sweeps through an entire circle 1136, where motion is indicated by a uni-directional arrow 1135, the light emitting elements 1107 illuminate and provide an image within the region indicated by the circle 1136.

In some embodiments, the single light-element-bearing arm 1101 is curved according to a variable or constant radius of curvature 1123 along the length 1111 of the arm 1101 or along the overall length 1112 of the display panel 102. In certain embodiments, the radius of curvature 1123 is a plurality of millimeters. When rotated, the arm 1101 flexes and alters its shape depending on a speed of rotation. In other embodiments, there is no curvature in the arm 1101 and the shape of the arm 1101 remains substantially the same when the display panel 102 is scanned through its movement path. At any given time, as the arm 1101 scans through its designated movement path, at least 90 percent of the area swept by the arm 1101 is completely unobstructed to receive ambient light. The radial arm 1101 takes the form of a generally continuous strip of material from the distal end 1104 to a center of gravity 1105 of the display panel 102.

Figure 12:
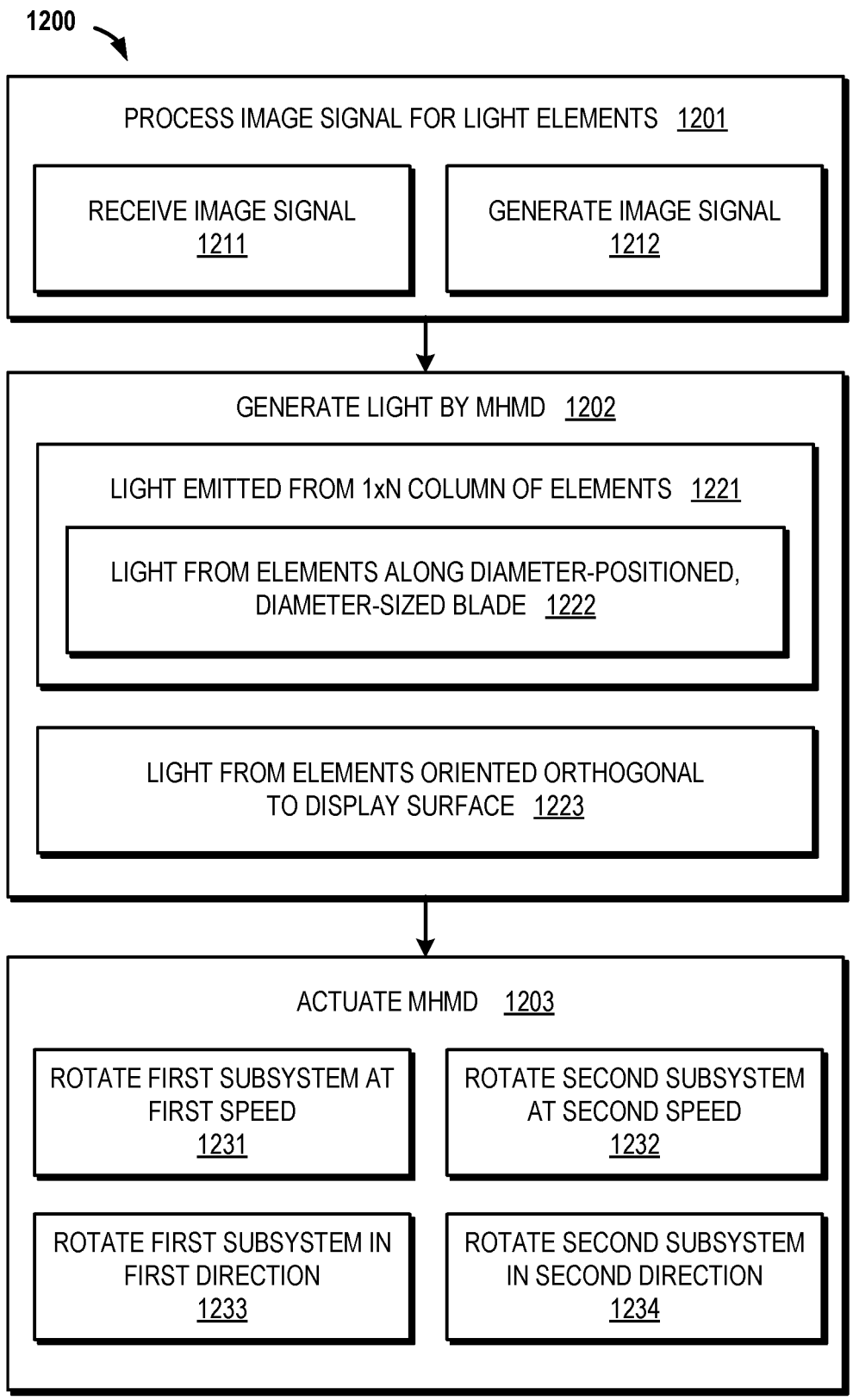
FIG. 12 is a block diagram illustrating a method for displaying an AR-based image with an MHMD according to some embodiments.

FIG. 12 is a block diagram illustrating a method 1200 for providing an AR-based image with an MHMD according to some embodiments. The method 1200 is first described generally, and then each portion of the method 1200 is discussed specifically. At block 1201, an MHMD system processes an image signal for its light emitting elements. At block 1202, light is generated by the MHMD. At block 1203, the MHMD is actuated.

Processing the image signal at block 1201 involves one or more activities. For example, at block 1211, the MHMD receives an image signal from an image generator such as across a network by a wired or wireless connection. In some embodiments, the image generator 1010 provides the image signal to the MHMD 1001. Or, at block 1212, components of the MHMD itself generate the image signal provided to a display controller, such as the display controller 1007, and the display controller operates the display to create the AR-based image. Based on the image signal, the MHMD generates light such as through a set of light emitting elements (LEEs) as described in more detail in relation to other figures. In certain embodiments, the LEEs are arranged in one or more columns of pixels on a structure such as a surface having a substantively spherical curvature. For example, at block 1221, light is emitted from a 1×N column of elements. The elements are generally oriented away from an eye-ward side of the MHMD.

At block 1222, the elements can be arranged along a region that is constructed to be positioned along some or all of a diameter of a light generating subsystem such as from a diameter-sized blade-shaped substrate material and the subsystem is centered in front of a user eye. In some embodiments, a center of motion of the components of the MHMD is not on the same axis of the user eye. This arrangement moves stationary, non-moving, occluding parts of a painted image off of an axis of the center of the user eye. In some embodiments, at block 1223, light is generated by LEEs oriented substantially orthogonal to a display surface of the substrate material and toward a mirrored area that reflects light toward a user's eyes.

One or more activities are involved in operation of the MHMD as indicated at block 1203 as actuating the MHMD. For example, at block 1231, a first subsystem having LEEs is operated at a first rotational speed or operational speed. In certain embodiments, at least a mirrored area positioned in front of LEEs is operated such as at the first rotational speed. In certain embodiments, both a LEE-bearing area and the mirrored area are operated at the first speed by a same mechanism (e.g., a rim motor 602, a shaft and motor 802). At block 1232, a second subsystem having LEEs is operated at a second speed in front of a second user eye. The first and second subsystems create a binocular AR-based image generating system for the user. The first and second speeds may be a substantially same speed. At block 1233, the first subsystem is operated in a first direction (e.g., clockwise, counterclockwise). At block 1234, the second subsystem is operated in a second direction or second manner. The first direction and the second direction may be a same direction or a different direction or manner with respect to one another.

Figure 13:
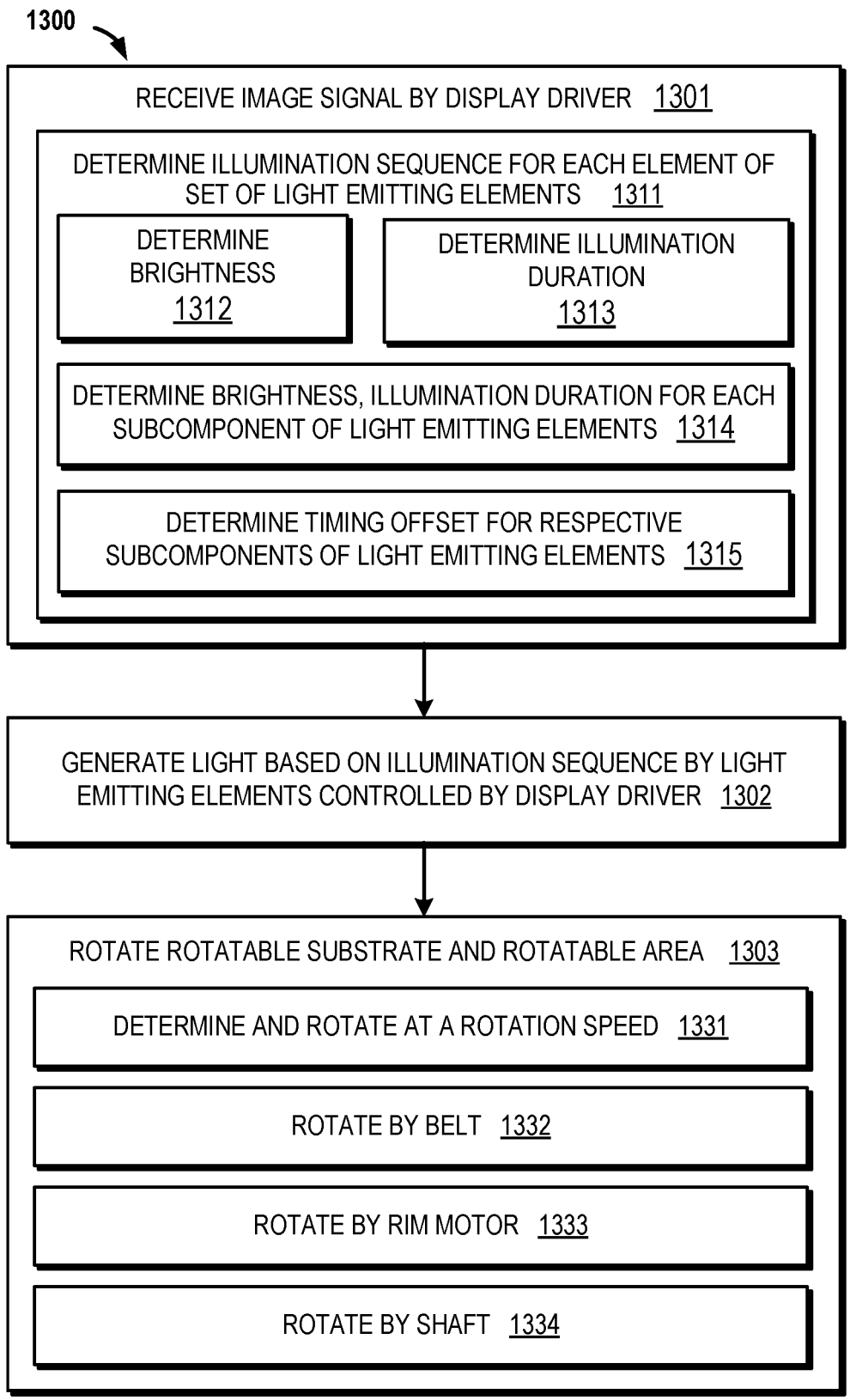
FIG. 13 is a block diagram illustrating a method to generate an augmented reality image in a MHMD in accordance with some embodiments.

FIG. 13 is a block diagram illustrating a method 1300 to generate an augmented reality image in an HMD system such as the system 300 and the system 1000. The method 1300 is first described generally, and then each portion of the method 1300 is discussed specifically. At block 1301, an image signal is received by a display driver such as the display controller 1007 or a display driver of an operating system. At block 1302, light is generated based on an illumination sequence by a set of light emitting elements controlled by the display driver. Generally, the light emitting elements are disposed on an operational substrate and oriented toward a world side of the HMD. At block 1303, the substrate and an operational component are operated. The operational component has a reflective surface oriented toward an eye-ward side of the HMD and is positioned on the world side of the set of the light emitting elements.

At block 1312, determining the illumination sequence for each light emitting element includes determining a brightness for each light emitting element. At block 1313, determining the illumination sequence for each light emitting element includes determining an illumination duration, from zero to some finite value in time duration, for each light emitting element. That is, in some circumstances, after receiving the image signal by the display driver at block 1301, the method 1300 includes determining at least one of a brightness and an illumination duration for each of the light emitting elements of the set of light emitting elements. In some embodiments, an illumination intensity is also determined for each of the light emitting elements of the set of light emitting elements. Where there are two or more subcomponents for each light emitting element, at block 1314, the method 1300 includes determining one or more of a brightness, intensity, and an illumination sequence for each subcomponent of each light emitting element. For circumferentially arranged subcomponents, determining the illumination sequence, at block 1315, includes determining a timing offset for respective subcomponents of each light emitting element depending on its respective physical position relative to one or more other subcomponents.

The method 1300 can include identifying or determining an illumination duration for each of the light emitting elements based on a radial position of the respective light emitting element from a center of operation or central vision axis based on an operational speed of the respective light emitting element around a center of operation. For example, for any given light emitting element, the illumination duration is shortened with increased distance from the center of operation to generate additional pixels at larger radii. For each scan, each pixel or subcomponent thereof is provided a signal to turn on to a certain intensity and for its respective illumination duration. The illumination sequence is made up of the set of signals for each pixel of the light emitting elements for each scan.

operating the substrate and the operational component includes, at block 1331, determining an operational speed, such as based on the generated illumination sequence, and operating the operational substrate and the operational component based on the determined speed. operating the operational substrate and the operational component can be performed at a substantially constant speed. At block 1332, operating the substrate and the operational component is performed by activation of a drive belt that is coupled to a motor and to an inner housing having an outer surface feature to engage with the drive belt. At block 1333, rotating the substrate and the operational component is performed by operation of a rim motor such as the rim motor 602. At block 1334, operating the substrate and the operational component is performed by activation of a shaft such as the shaft 801.

While many of the embodiments of components described herein are illustrated as having flat or spherical surfaces, one or more components of the MHMDs illustrated herein may be curved in a desired manner to shape a path and resulting image in at least some embodiments, and the curvatures of these components may be similar or different to one another but are generally curved in coordination with one another to provide a substantially undistorted image to an eye by movement of a component such as light-producing pixels and mirrored area in front of one or both user eyes. As understood by those in the art, the illustrated components are not drawn to scale and are illustrated in certain views and orientations for sake of clarity. Variations in positions and angles are possible depending on one or more factors including composition of each component and structural substance needed to safely allow operation of the same.

In some embodiments, certain aspects of the techniques described above may implemented by one or more processors of a processing system executing software and provided as instructions to control one or more aspects of the components described herein. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements or components included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A head mounted display (HMD) system comprising:
   a substrate supporting a set of light emitting elements, wherein each light emitting element is oriented toward a world side of the HMD system;
   a reflective surface oriented toward a user eye;
   a motor coupled to the substrate and the reflective surface for motion of the substrate and reflective surface; and
   a display driver electrically coupled to the set of light emitting elements and configured to selectively activate the set of light emitting elements so as to generate an image during rotation of the substrate and the reflective surface around an optical axis of the HMD, wherein the optical axis is aligned with a user's eye.

2. The HMD system of claim 1, further comprising:
   a circular, transparent support for the reflective surface.

3. The HMD system of claim 2, wherein the circular, transparent support has a surface supporting the reflective surface, and wherein the reflective surface is spherically shaped with a center on an eye-ward side of the HMD system.

4. The HMD system of claim 2, wherein the circular, transparent support has a radius of curvature greater than 10 mm.

5. The HMD system of claim 2, wherein the center of the reflective surface is on the optical axis of the HMD system.

6. The HMD system of claim 1, wherein the light emitting elements are arranged in one column of light emitting elements along the substrate.

7. The HMD system of claim 1, wherein the light emitting elements are arranged in two columns of light emitting elements, and wherein the substrate supporting the light emitting elements is curved according to a constant or variable radius of curvature.

8. The HMD system of claim 1, further comprising:
   an outer housing substantially enclosing the substrate and the reflective surface, and wherein the reflective surface is positioned on the world side of the set of the light emitting elements.

9. The HMD system of claim 8, wherein a center of the substrate is on the optical axis of the HMD system.

10. The HMD system of claim 1, wherein the substrate has a surface supporting the light emitting elements and the surface is spherically shaped with a center on an eye-ward side of the HMD system.

11. The HMD system of claim 1, wherein the substrate has a spherically shaped surface supporting the light emitting elements and each of the light emitting elements is mounted substantially orthogonal to the spherically shaped surface.

12. The HMD system of claim 1, wherein power is supplied to the light emitting elements through induction.

13. The HMD system of claim 1, further comprising:
    a bearing assembly; and
    a rotatable housing, wherein the substrate and the reflective surface are each coupled to the rotatable housing, and wherein the rotatable housing is coupled to a portion of the bearing assembly for rotation by the motor.

14. The HMD system of claim 13, wherein the display driver is mounted to the rotatable housing, and wherein the bearing assembly includes one of an air-suspended bearing and a magnetically-suspended bearing.

15. The HMD system of claim 13, wherein the motor is a rim motor and rotation of the rotatable housing is actuated at a rim of the rotatable housing.

16. The HMD system of claim 1, further comprising:
    a drive belt coupled to the motor;
    a bearing assembly; and
    a rotatable housing having a surface feature to engage with the drive belt, wherein the substrate and the reflective surface are each coupled to the rotatable housing, and wherein the rotatable housing is rotated by operation of the drive belt and the motor.

17. A method to generate an augmented reality image in a head mounted display (HMD) system, the method comprising:
    receiving an image signal by a display driver;
    generating light based on an illumination sequence by a set of light emitting elements controlled by the display driver, wherein the light emitting elements are disposed on a substrate and oriented toward a world side of the HMD; and
    rotating the substrate and a reflective surface around an optical axis of the HMD aligned with a user's eye, wherein the reflective surface is oriented toward an eye-ward side of the HMD and positioned on the world side of the set of the light emitting elements.

18. The method of claim 17, wherein the reflective surface is supported by a circular, transparent support.

19. The method of claim 17, further comprising:

after receiving the image signal by the display driver, determining the illumination sequence for each element of the set of light emitting elements including at least one of a brightness and an illumination duration for each of the light emitting elements of the set of light emitting elements.

20. The method of claim 19, wherein each light emitting element includes at least two subcomponents, and wherein determining the illumination sequence for each element includes determining at least one of a brightness and an illumination duration for each subcomponent of each light emitting element of the set of light emitting elements.

21. The method of claim 20, wherein subcomponents of each light emitting element is positioned circumferentially with respect to one another, and wherein determining the illumination sequence for each light emitting element includes determining a timing offset for respective subcomponents of each light emitting element.

22. The method of claim 17, wherein determining the illumination sequence includes identifying an illumination duration for each of the light emitting elements based on a radial position of the respective light emitting element from a center of rotation.

23. The method of claim 17, wherein determining the illumination sequence includes identifying an illumination duration for each of the light emitting elements based on a rotational speed of the respective light emitting element around a center of rotation.

24. The method of claim 23, wherein rotating the substrate and the reflective surface includes determining a rotation speed based on the illumination sequence and rotating the rotatable substrate and the reflective surface based on the rotation speed.

25. The method of claim 17, wherein the substrate and the reflective surface are rotated at a substantially constant rotational speed.

26. The method of claim 17, wherein rotating the substrate and the reflective surface is performed by rotating a drive belt coupled to a motor and to a rotatable housing having an outer surface feature to engage with the drive belt.

27. The method of claim 17, wherein the substrate has a surface supporting the light emitting elements and the surface is spherically shaped with a center on an eye-ward side of the HMD.

* * * * *